No. 871,797. PATENTED NOV. 26, 1907.
G. GREEN.
COOLING SYSTEM FOR INTERNAL COMBUSTION ENGINES.
APPLICATION FILED SEPT. 15, 1905.
2 SHEETS—SHEET 1.
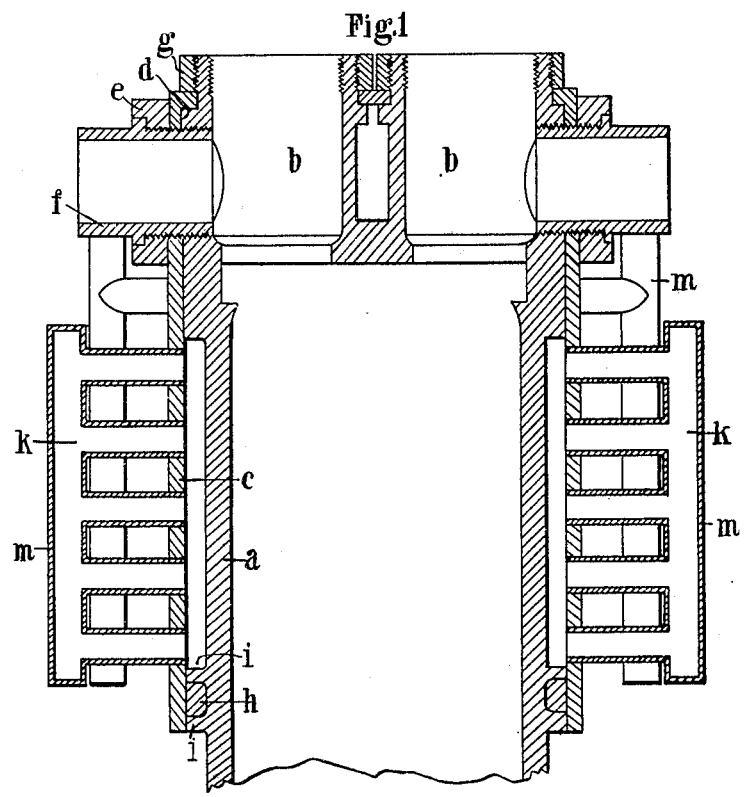
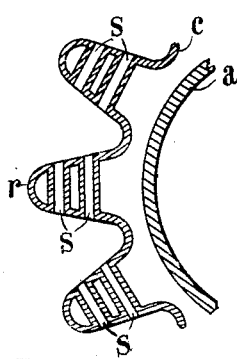
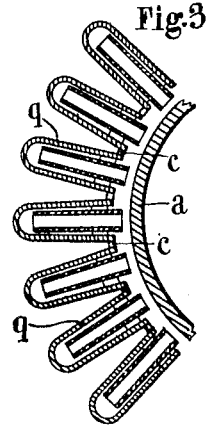
Witnesses,
Inventor.
Gustavus Green
per Herbert Sefton Jones
Attorney.

No. 871,797. PATENTED NOV. 26, 1907.
G. GREEN.
COOLING SYSTEM FOR INTERNAL COMBUSTION ENGINES.
APPLICATION FILED SEPT. 15, 1905.
2 SHEETS—SHEET 2.
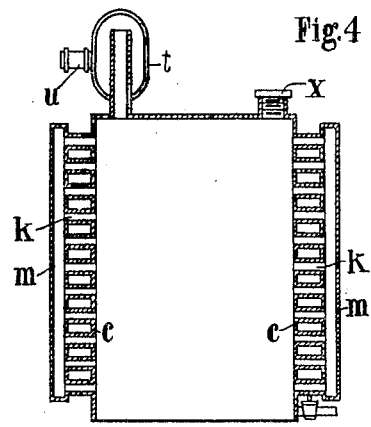
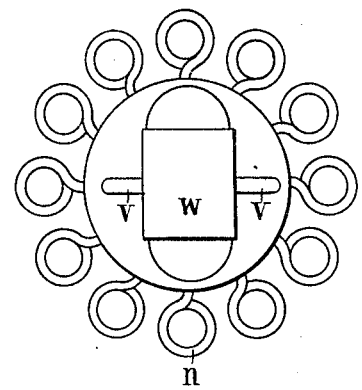
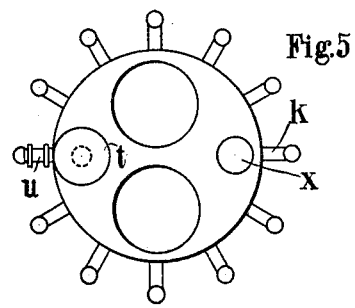
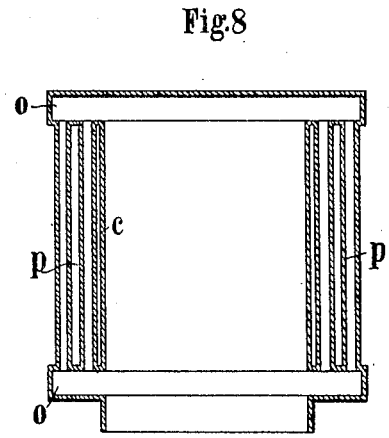
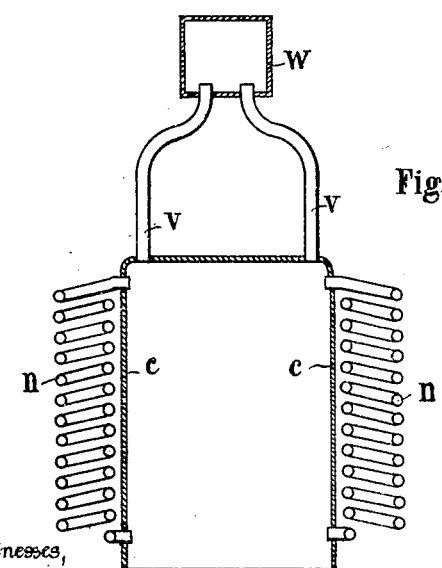
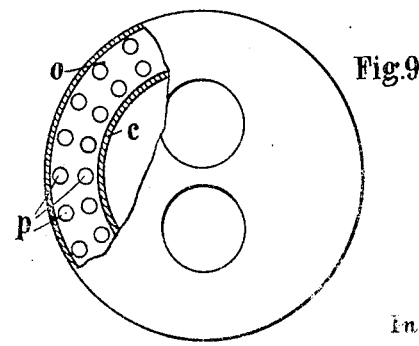
Inventor
Gustavus Green

UNITED STATES PATENT OFFICE.

GUSTAVUS GREEN, OF BEXHILL, ENGLAND, ASSIGNOR OF ONE-FOURTH TO FRANCIS PELHAM CLINTON HOPE AND ONE-FOURTH TO JOSEPH MILLER, OF BEXHILL, COUNTY OF SUSSEX, ENGLAND.

COOLING SYSTEM FOR INTERNAL-COMBUSTION ENGINES.

No. 871,797. Specification of Letters Patent. Patented Nov. 26, 1907.

Application filed September 15, 1905. Serial No. 278,597.

*To all whom it may concern:*

Be it known that I, GUSTAVUS GREEN, engineer, a subject of the King of Great Britain, residing at 49 Reginald road, Bexhill-on-Sea, in the county of Sussex, England, have invented new and useful Improvements in Cooling Systems for Internal-Combustion Engines, of which the following is a specification.

This invention relates to cooling systems, especially applicable to small internal combustion engines such as are employed on motor cycles.

It is the object of the invention to provide a water cooling arrangement which is complete in itself and is applicable to the cylinders of such small engines.

In carrying the invention into effect, a separate water jacket is preferably provided for the cylinder, and around this water jacket, pipes, tubular columns, or the like are arranged exposed to the air in order to serve as a radiator, i. e., to make cooling and circulating passages for the water.

In the accompanying drawings: Figure 1 shows a vertical section through the upper part of a cylinder provided with a water jacket in accordance with this invention. Figs. 2 and 3 are similar detail views showing portions of modified forms of water jackets in section. Figs. 4 and 5, Figs. 6 and 7, and Figs. 8 and 9 are respectively sectional elevations and plan views of modified forms of the water jackets.

Referring first to Fig. 1, $a$ shows a cylinder of an engine having sockets $b$, $b$ at the top thereof for receiving the valves.

$c$ is the separate water jacket made of brass or other suitable material and fitting over turned bosses $d$ through holes in which communication is established with the valve sockets $b$.

$e$ are collars pulled up against the jacket $c$ by threaded tube sections $f$ which are screwed into said bosses in order to press together the collars $e$, jacket and bosses $d$. A water-tight joint is thus made around these openings, while the jacket is pressed down around the tops of sockets $b$ by screwed rings $g$.

$h$ is a packing-ring of rubber or the like lying between collars $i$ around the cylinder and serving to form a water-tight joint at the lower end of the jacket. The sparking plug (not shown) is inserted in any convenient position in the head or top of the jacket and cylinder. It is preferable to employ a separable water jacket $c$ such as is above explained.

The construction of the cooling arrangement shown in Figs. 4 and 5 is the same as that shown in Fig. 1. Short tubes $k$ project outward in rows around the water jacket $c$ and are connected at their outer ends by vertical tubes $m$ into which they are brazed or soldered (preferably the former). The water can circulate between the cylinder $a$ and jacket $c$ through the tubes $k$ and $m$. When the engine is used, the rush of air over the tubes $k$ and $m$ cools the water and this latter circulates through the tubes and jacket, keeping the cylinder cool.

Figs. 6 and 7 show a modification wherein coils of tubing $n$ are connected at the top and bottom only with the jackets $c$, these coils being arranged suitably around the jacket and serving the same purpose as the tubes $k$ and $m$ in the construction of Figs. 1, 4 and 5.

Figs. 8 and 9 show an arrangement wherein the jacket has drum-shaped upper and lower ends $o$ with vertical tubes $p$ extending between the same. The effect is similar to that above described, the water circulating through the drums and tubes $p$.

The modification illustrated in Fig. 3 shows the well known "Field" tubes $q$ applied to a water jacket $c$, these tubes being fitted into the walls of the jacket as shown, and serving to effect the cooling of the water.

Fig. 2 shows the jacket $c$ made with corrugations $r$ through which pass tubes $s$ open at both ends to the air. In this case the air rushes through the tubes $s$ cooling the water in the corrugations $r$.

The above described arrangements are intended to serve as examples of construction in accordance with this invention, wherein the jacket is provided with pipes, tubes or the like, giving a large cooling surface around the jacket which will act as a radiator for the purpose of keeping the water cool. In order to allow for expansion of the water, for the escape of steam if necessary, and in fact to form a safety opening, any suitable safety device may be provided and the jacket may communicate with a water tank of small capacity. Figs. 4 and 5 show an air pressure chamber *t* fixed to the top of the jacket and adapted to allow for the expansion of the water in well known manner. A safety valve *u* may be mounted on the side of the expansion vessel *t*. *x* is a screw cap through which the jacket is filled with water.

Fig. 6 shows pipes *v* leading from the jacket to a small water tank *w*. In this latter construction, the tank must be supplied with water when the same evaporates in order that the jacket may always be full of water.

Other arrangements of a well known character might be provided for allowing for the expansion of the water and permitting of filling of the tank.

The valves may be arranged in any suitable way not necessarily as suggested with reference to Fig. 1, while of course the whole or part of one of the cooling members, such as the tubes *k* and a pipe *m* (Figs. 1, 4 and 5), or a coil *n* (Figs. 6 and 7) may be omitted to leave part of the surface of the jacket clear for insertion of the sparking plug, inlet and exhaust pipes and so forth.

In Fig. 1 the tubes *k* and *m* which are in section, are so shortened to facilitate insertion of the inlet and exhaust tube sections *f*.

What I claim is:

1. In an internal combustion engine the combination with the cylinder of a water jacket, a radiator connected with the same and projecting beyond the surface of said jacket, said radiator comprising sets of adjacent channels for the circulation of the water communicating with the upper and lower parts of the jacket, and confined to the space immediately around the sides of the jacket, and being distributed around the same in such manner as to efficiently utilize the available cooling space round the jacket.

2. In an internal combustion engine the combination with the cylinder and water jacket, of pipes adjacent to said jacket connected to the jacket near their ends and at intermediate points and arranged longitudinally of said cylinder in such manner as to efficiently utilize for cooling apparatus the space available immediately around the jacket, and to form channels for the circulation and cooling of the water.

In testimony whereof I have signed my name to this specification in the presence of two subscribing witnesses.

GUSTAVUS GREEN.

Witnesses:
HUBERT A. GILL,
LEON. E. HAYNES